United States Patent
Cordeiro De Oliveira Barros et al.

(10) Patent No.: US 9,692,604 B2
(45) Date of Patent: *Jun. 27, 2017

(54) PROBABILISTIC KEY DISTRIBUTION IN VEHICULAR NETWORKS WITH INFRASTRUCTURE SUPPORT

(71) Applicant: UNIVERSIDADE DO PORTO, Oporto (PT)

(72) Inventors: João Francisco Cordeiro De Oliveira Barros, Porto (PT); João Paulo Patriarca De Almeida, Porto (PT); Mate Boban, Porto (PT); Saurabh Shintre, Porto (PT)

(73) Assignee: Universidade Do Porto, Porto (PT)

( * ) Notice: Subject to any disclaimer, the term of this patent is extended or adjusted under 35 U.S.C. 154(b) by 0 days.

This patent is subject to a terminal disclaimer.

(21) Appl. No.: 15/051,817

(22) Filed: Feb. 24, 2016

(65) Prior Publication Data

US 2016/0248594 A1 Aug. 25, 2016

Related U.S. Application Data

(63) Continuation of application No. 14/402,536, filed as application No. PCT/IB2013/059978 on Nov. 7, 2013, now Pat. No. 9,276,743.

(30) Foreign Application Priority Data

Nov. 7, 2012 (PT) .......................................... 106626

(51) Int. Cl.
*H04L 29/06* (2006.01)
*H04L 9/32* (2006.01)
(Continued)

(52) U.S. Cl.
CPC ............ *H04L 9/3263* (2013.01); *H04L 9/006* (2013.01); *H04L 9/083* (2013.01); *H04L 9/0838* (2013.01);
(Continued)

(58) Field of Classification Search
CPC ......... H04L 67/12; H04L 9/006; H04L 9/083; H04L 9/0838; H04L 9/0844; H04L 9/14;
(Continued)

(56) References Cited

U.S. PATENT DOCUMENTS

2004/0003230 A1* 1/2004 Puhl ........................ G06F 21/34
713/155
2007/0223702 A1* 9/2007 Tengler ................. H04L 9/3263
380/270

OTHER PUBLICATIONS

M. Raya; J.-P. Hubaux: 'Securing vehicular ad hoc networks' Journal of Computer Security vol. 15, No. 1, Apr. 2007, pp. 39-68.
(Continued)

*Primary Examiner* — Yogesh Paliwal
(74) *Attorney, Agent, or Firm* — Occhiuti & Rohlicek LLP (57) ABSTRACT

Method and system of key distribution by trusted nodes for a vehicular ad hoc network, the nodes of said network having at least one pair of public-private keys and the corresponding certificates, issued by a CA, said method comprising each vehicle node, on entering said network region, requesting a set of keys from an RSU node that is within range and within that region, said RSU node sending said vehicle node a set of private keys, selected from a pool of private keys, and a list with the key identifiers of the private keys shared by said vehicle node and the other vehicle nodes that have most recently contacted said RSU for a predetermined period of time; such that two nodes are able to establish a secure connection without further inter-
(Continued)

action by deriving a shared secret which is a cryptographic hash function of the keys shared by said two nodes.

19 Claims, 5 Drawing Sheets

(51) Int. Cl.
| | | |
|---|---|---|
| H04L 9/08 | (2006.01) | |
| H04W 12/04 | (2009.01) | |
| H04L 9/14 | (2006.01) | |
| H04L 9/30 | (2006.01) | |
| H04L 29/08 | (2006.01) | |
| H04L 9/00 | (2006.01) | |
| H04W 12/06 | (2009.01) | |
| H04W 4/04 | (2009.01) | |
| H04W 84/18 | (2009.01) | |

(52) U.S. Cl.
CPC ............ *H04L 9/0844* (2013.01); *H04L 9/14* (2013.01); *H04L 9/30* (2013.01); *H04L 9/3265* (2013.01); *H04L 63/06* (2013.01); *H04L 63/0869* (2013.01); *H04L 67/12* (2013.01); *H04W 12/04* (2013.01); *H04W 12/06* (2013.01); *H04L 63/061* (2013.01); *H04L 63/062* (2013.01); *H04L 63/065* (2013.01); *H04L 63/068* (2013.01); *H04L 2209/24* (2013.01); *H04L 2209/80* (2013.01); *H04L 2209/84* (2013.01); *H04W 4/046* (2013.01); *H04W 84/18* (2013.01)

(58) Field of Classification Search
CPC ....... H04L 9/30; H04L 9/3265; H04L 9/3263; H04L 2209/24; H04L 2209/80; H04L 2209/84; H04L 63/06; H04L 63/061; H04L 63/062; H04L 63/065; H04L 63/068; H04L 63/0869; H04W 12/04; H04W 12/06; H04W 4/046; H04W 84/18
USPC .................................................. 380/255, 277
See application file for complete search history.

(56) References Cited

OTHER PUBLICATIONS

B. Parno; A. Perrig: 'Challenges in Securing Vehicular Networks' Proc. of the ACM Workshop on Hot Topics in Networks Nov. 2005.
Weimerskirch; J. J. Haas; Y.-C. Hu; K. P. Laberteaux: 'VANET: Vehicular Applications and Inter-Networking Technologies', Dec. 2009.
Wiley Olaverri-Monreal; P. Gomes; R. Fernandes; F. Vieira; M. Ferreira: 'The See-Through System: A VANET-enabled assistant for overtaking maneuvers' Proceedings of the IEEE Intelligent Vehicles Symposium Jun. 2010, pp. 123-128.
Lochert; B. Scheuermann; C. Wewetzer; A. Luebke; M. Mauve: 'Data aggregation and roadside unit placement for a vanet traffic information system' Proceedings of the Fifth ACM International Workshop on Vehicular Inter-Networking, Ser. VANET'08 2008, pp. 58-65.
K. Tonguz; M. Boban: 'Multiplayer games over vehicular ad hoc networks: A new application' Ad Hoc Networks vol. 8, No. 5, 2010, pp. 531-543.
B. Schneier: 'Applied Cryptography: Protocols, Algorithms, and Source Code', 1995, John Wiley & Sons, Inc.
L. Eschenauer; V. D. Gligor: 'A key-management scheme for distributed sensor networks' Proc. of the 9th ACM Conference on Computer and Communications Security 2002, pp. 41-47.
P. Papadimitratos; L. Buttyan; T. Holczer; E. Schoch; J. Freudiger; M. Raya; Z. Ma; F. Kargl; A. Kung; J.-P. Hubaux: 'Secure vehicular communications: design and architecture' IEEE Communications Magazine vol. 46, No. 11, Nov. 2008, pp. 100-109.
M. Boban; T. Vinhoza; M. Ferreira; J. Barros; O. Tonguz: 'Impact of vehicles as obstacles in vehicular ad hoc networks' Selected Areas in Communications, IEEE Journal on vol. 29, No. 1, Jan. 2011, pp. 15-28.
D. R. Choffnes; F. E. Bustamante: 'An integrated mobility and traffic model for vehicular wireless networks' Proceedings of the 2nd ACM International Workshop on Vehicular Ad Hoc Networks 2005, pp. 69-78.
R. Meireles; M. Ferreira; J. Barros: 'Vehicular connectivity models: From single-hop links to large-scale behavior' Proc. of the 70th IEEE Vehicular Technology Conference VTC2009-Fall Sep. 2009.
A.Paier; R. Tresch; A. Alonso; D. Smely; P. Meckel; Y. Zhou; N. Czink: 'Average downstream performance of measured ieee 802. 11p infrastructure-to-vehicle links' Communications Workshops (ICC), 2010 IEEE International Conference on, May 2010 pp. 1-5.
R. Meireles; M. Boban; P. Steenkiste; O. K. Tonguz; J. Barros: 'Experimental study on the impact of vehicular obstructions in VANETs' IEEE Vehicular Networking Conference (VNC 2010 Dec. 2010, pp. 338-345.
H. Chan; V. D. Gligor; A. Perrig; G. Muralidharan: 'On the distribution and revocation of cryptographic keys in sensor networks' IEEE Transactions on Dependable and Secure Computing vol. 2, 2005, pp. 233-247.
'Vehicular Network:Network: Techniques, Standards, and Applications', Apr. 9, 2009.
Jean-Pierre Hubaux: 'Securing Vehicular Communications, Maxim Raya, Panos Papadimitratos' IEEE Wireless Communications Magazine, Special Issue on Inter-Vehicular Communications Oct. 2006.
Caballero-Gil P et al: "Flexible authentication in vehicular ad hoc networks", Communications, 2009. APCC 2009. 15th Asia-Pacific Conference on, IEEE, Piscataway, NJ, USA, Oct. 8, 2009 (Oct. 8, 2009), pp. 576-879, XP031597314, ISBN: 978-1-4244-4784-.
Alsharif, N. et ai., ESPR: Efficient Security Scheme for Position-Based Routing in VehicularAd Hoc Networks, Proceedings 2010 IEEE Global Communications Conference (GLOBECOM 2010), Dec. 6-10, 2010, Miami, EL, USA, iEEE, Piscataway, NJ, USA, 5pp. Dec. 6, 2010.
Li, W. et ai., An efficient and secure mobile payment protocol for restricted connectivity scenarios in vehicular ad hoc network, Computer Communications, Voi. 35, No. 2, Jan. 15, 2012 (online Sep. 10, 2011), Elsevier Science Publishers B.V., Amsterdam, Netherlands, pp. 188-195 Sep. 10, 2011.
Wasef, A. et ai., "PPGCV: privacy preserving group communications protocol for vehicular ad hoc networks", 2008 internationai Conference on Communications, May 19-23, 2008, Beijing, China, IEEE, Piscataway, NJ, USA, pp. 1458-1463 May 19, 2008.

* cited by examiner

PROBABILISTIC KEY DISTRIBUTION IN VEHICULAR NETWORKS WITH INFRASTRUCTURE SUPPORT

TECHNICAL FIELD

Probabilistic key distribution protocol for vehicular network that alleviates the burden of traditional public-key infrastructures, wherein roadside units act as trusted nodes and are used for secret-sharing among vehicles in their vicinity. Secure communication is immediately possible between these vehicles with high probability, providing high reliability and short dissemination times that can be achieved with low complexity.

BACKGROUND ART

Vehicular Ad-hoc Networks (VANETs) are expected to enable increased safety, enhanced driving experience, and improved traffic efficiency. These networks are characterized by short-lived pairwise connections, which makes the network topology highly dynamic. Furthermore, single trip of a vehicle may involve communication with a large number of other vehicles. Dependence on such technology, however, may turn hazardous if not implemented securely, particularly due to the vulnerability of the wireless medium to passive and active attacks.

Messages exchanged in a VANET have different roles, thus requiring different security measures. For instance, securing safety messages requires the deployment of a scheme that would privilege authentication over confidentiality [1], since the information contained in the message is not particularly sensitive and may be of interest to multiple users, while the legitimacy of the source is important. These applications lie at the heart of vehicular networks, and perhaps for that reason it is generally considered that integrity and authentication are of greater concern than confidentiality. Therefore, most security schemes adopt vehicular public key infrastructures (PKI), e.g., [2], [3] that, in general, make use of public key cryptography (PKC) for authentication. A large number of applications and services that could be deployed in VANETs may depend on confidential data transmission. These applications range from driver assistance systems (e.g., [4]) to traffic information systems (e.g., [5]) and infotainment applications (e.g., [6]. Although PKC could also be used for encryption, efficiency dictates that the best course of action to provide confidential transmission is to use symmetric encryption with a shared secret [7]. However, PKC solutions are not adequate for noisy environments since they generally employ several rounds of interaction between users. Furthermore, in dense networks, the overhead of message transmission and signature verification can be prohibitive [1].

Due to the vital role of authentication, proposed VANET security frameworks rely heavily on PKC. Consequently, most of the research focuses on the design of PKI-based key management systems for pairwise or group communication (e.g., [1], [9]). When symmetric encryption is required, it is expected that nodes perform some well-known key agreement schemes or use integrated encryption schemes. In particular, the IEEE 1609.2 standard specifies the Elliptic Curve Integrated Encryption Scheme as the asymmetric encryption algorithm [3], which is based on Diffie-Hellman key agreement. In [9], an architecture was proposed for secure vehicular communications, which includes a key management scheme. Certification authorities (CAs) are responsible for managing the identity and credentials of vehicles registered within a given region. Each node is registered only in a given CA, which provides it with a unique ID, a long-term pair of private/public keys and a long-term certificate. To achieve secure communication, short-term private-public key pairs and certificates are used. These are internally generated by the node and signed by the CA. Raya and Hubaux [1] designed a security framework for VANETs based on PKI. A protocol is proposed which uses the geographic location of vehicles. In the protocol, a geographic group is formed, which elects a group leader, responsible for distributing a group key to its members, enabling secure communication within the group. In any scenario where the protocol cannot function properly, the fallback to a simple digital signature scheme is ensured.

In practice, VANETs are characterized by a dynamic topology and link disconnections are frequent. Moreover, sporadic and burst errors are common due to the presence of signal propagation obstacles that lead to shadowing [10]. Therefore, it is crucial that the key agreement protocol makes use of the least possible interaction between users in order to minimize the overall delay in the key establishment procedure as well as maximizing the probability of success. This can be achieved by means of probabilistic key distribution schemes. However, due to the size and dynamic nature of these networks, key pre-distribution is unfeasible.

REFERENCES

[1] M. Raya and J.-P. Hubaux, "Securing vehicular ad hoc networks," Journal of Computer Security, vol. 15, no. 1, pp. 39-68, April 2007.
[2] B. Parno and A. Perrig, "Challenges in Securing Vehicular Networks," in Proc. of the ACM Workshop on Hot Topics in Networks, November 2005.
[3] A. Weimerskirch, J. J. Haas, Y.-C. Hu, and K. P. Laberteaux, VANET: Vehicular Applications and Inter-Networking Technologies. Wiley, December 2009, ch. Data Security in Vehicular Communication Networks.
[4] C. Olaverri-Monreal, P. Gomes, R. Fernandes, F. Vieira, and M. Ferreira, "The See-Through System: A VANET-enabled assistant for overtaking maneuvers," in Proceedings of the IEEE Intelligent Vehicles Symposium, June 2010, pp. 123-128.
[5] C. Lochert, B. Scheuermann, C. Wewetzer, A. Luebke, and M. Mauve, "Data aggregation and roadside unit placement for a vanet traffic information system," in Proceedings of the fifth ACM International Workshop on VehiculAr Inter-NETworking, ser. VANET '08, 2008, pp. 58-65.
[6] O. K. Tonguz and M. Boban, "Multiplayer games over vehicular ad hoc networks: A new application," Ad Hoc Networks, vol. 8, no. 5, pp. 531-543, 2010.
[7] B. Schneier, Applied Cryptography: Protocols, Algorithms, and Source Code in C. New York, N.Y., USA: John Wiley & Sons, Inc., 1995.
[8] L. Eschenauer and V. D. Gligor, "A key-management scheme for distributed sensor networks," in Proc. of the 9th ACM Conference on Computer and Communications Security, 2002, pp. 41-47.
[9] P. Papadimitratos, L. Buttyan, T. Holczer, E. Schoch, J. Freudiger, M. Raya, Z. Ma, F. Kargl, A. Kung, and J.-P. Hubaux, "Secure vehicular communications: design and architecture," IEEE Communications Magazine, vol. 46, no. 11, pp. 100-109, November 2008.
[10] M. Boban, T. Vinhoza, M. Ferreira, J. Barros, and O. Tonguz, "Impact of vehicles as obstacles in vehicular ad hoc networks," Selected Areas in Communications, IEEE Journal on, vol. 29, no. 1, pp. 15-28, January 2011.

[11] D. R. Choffnes and F. E. Bustamante, "An integrated mobility and traffic model for vehicular wireless networks," in Proceedings of the 2nd ACM international workshop on Vehicular ad hoc networks, 2005, pp. 69-78.

[12] R. Meireles, M. Ferreira, and J. Barros, "Vehicular connectivity models: From single-hop links to large-scale behavior," in Proc. of the 70th IEEE Vehicular Technology Conference VTC2009-Fall, September 2009.

[13] A. Paier, R. Tresch, A. Alonso, D. Smely, P. Meckel, Y. Zhou, and N. Czink, "Average downstream performance of measured ieee 802.11p infrastructure-to-vehicle links," in Communications Workshops (ICC), 2010 IEEE International Conference on, may 2010, pp. 1-5.

[14] R. Meireles, M. Boban, P. Steenkiste, O. K. Tonguz, and J. Barros, "Experimental study on the impact of vehicular obstructions in VANETs," in IEEE Vehicular Networking Conference (VNC 2010), Jersey City, N.J., USA, December 2010, pp. 338-345.

[15] H. Chan, V. D. Gligor, A. Perrig, and G. Muralidharan, "On the distribution and revocation of cryptographic keys in sensor networks," IEEE Transactions on Dependable and Secure Computing, vol. 2, pp. 233-247, 2005.

SUMMARY

The disclosure comprises a method of key distribution by trusted nodes for a vehicular ad hoc network, VANET, wherein said vehicular ad hoc network is composed of nodes, a node being either a mobile vehicle node equipped with an on-board unit or a static road-side unit node, herewith referred respectively as vehicle nodes and RSU nodes, wherein said RSU nodes have a permanent connection to a certificate authority, CA, said CA being responsible for a specific geographic region in which the VANET is comprised and said CA acting as the root of trust for the VANET, and wherein the VANET nodes have at least one pair of public-private keys and the corresponding certificates, issued by said CA, wherein said method comprises the steps of:
  each vehicle node, on entering said specific geographic region, requests a set of keys from an RSU node that is within range and within that region, either
    by direct communication, or
    by through multi-hop communication,
  wherein said vehicle node sends a key request to said RSU, said request including the vehicle node public key;
  said RSU node sends said vehicle node a set of private keys, selected from a pool of private keys available to the RSU node, said set of keys being encrypted with the vehicle node public key, wherein said set of private keys also includes a key identifier for each private key in said set;
  said RSU node sends said vehicle node a list with the key identifiers of the private keys shared by said vehicle node and the other vehicle nodes that have most recently contacted said RSU for a predetermined period of time;
  said RSU informs the VANET nodes, within a neighborhood of a predetermined number of hops from said RSU, of the presence of said vehicle node and of the identifiers of keys obtained by said vehicle node;
such that two vehicle nodes are able to immediately establish a secure connection if there are shared keys between those two vehicles, without further interaction, by deriving a new shared secret which is a cryptographic hash function of the keys shared by said two nodes.

An embodiment, wherein a sender node which is interested in communicating with a receiver node, if said sender node does not know the private keys held by the receiver node, comprises the step of both nodes broadcasting the key identifiers of the private keys held by each node, such that if there are shared keys then two nodes are then able to establish a secure connection, without further interaction, by deriving a new shared secret which is a cryptographic hash function of the keys shared by said vehicle node and one of the other vehicle nodes.

In an embodiment, wherein if there are not shared keys between the two nodes, then the two nodes will establish a shared secret via standard PKC methods.

In an embodiment, wherein if an RSU node or nodes are compromised, said method comprises the steps of:
  the CA provides a new pool of keys to all RSU nodes that are not compromised, from which said pool of keys the vehicle nodes will then be able to obtain new keys;
  the vehicle nodes are informed of the existence of the compromised RSU node or nodes.

In an embodiment, the private key identifiers are sequential IDs attributed as the private keys are generated.

In an embodiment, for key distribution spanning multiple independent CA's, each CA with a predetermined geographical area, the pool of private keys available to each RSU node is unique to a partitioned key space corresponding to the geographical area of each independent CA.

In an embodiment, for key distribution spanning multiple independent CA's, each CA with a predetermined geographical area, the pool of private keys available to each RSU node comprises an additional key space that is parallel to said CA's and is thus shared by all CA's.

In an embodiment, for key distribution spanning multiple independent CA's, each CA with a predetermined geographical area, said additional key space is made available by the RSU nodes only to vehicles that require communication between independent CAs.

An embodiment, for a vehicle node on moving from a first CA geographic region to a second CA geographic region, comprises the following steps:
  before leaving said first CA geographic region, said vehicle node requests a set of keys from an RSU node that is within range and within that first CA region, indicating that those requested keys are for said second CA geographic region;
  said RSU node then sends the vehicle node request to the first CA for a set of keys that can be used within the region controlled by the second CA;
  the first CA forwards the vehicle node request to the second CA;
  the second CA responds with a set of keys that can be used within the region controlled by the second CA with the respective list of identifiers which are sent to the vehicle node encrypted with the vehicle node public key;
such that such the vehicle node will be able to immediately establish a secure connection with any node in said second CA geographic region by deriving a new shared secret which is a cryptographic hash function of the keys shared by the two nodes.

In an embodiment, for a vehicle node on moving from a first CA geographic region to a second CA geographic region, said RSU node is a RSU border node of the first CA geographic region.

The disclosure also comprises a device for key distribution by trusted nodes for a vehicular ad hoc network, VANET, wherein said vehicular ad hoc network is composed of nodes, a node being either a mobile vehicle node equipped with an on-board unit or a static road-side unit node, herewith referred respectively as vehicle nodes and RSU nodes, wherein said RSU nodes have a permanent connection to a certificate authority, CA, said CA being responsible for a specific geographic region in which the VANET is comprised and said CA acting as the root of trust for the VANET, and wherein the VANET nodes have at least one pair of public-private keys and the corresponding certificates, issued by said CA, wherein each node comprises a data processing module configured to carry out the method of any one of the previous embodiments.

The disclosure also comprises a computer readable data carrier comprising the computer program instructions adapted to perform the method of any of the previous embodiment methods when said program is run on a data processor.

DISCLOSURE OF THE INVENTION

The proposed probabilistic key distribution scheme can act as a mechanism for ensuring secure communication in VANETs. The present protocol ensures that a secure connection can be established with high probability for reasonably small key rings. Leveraging on network infrastructure, the number of (re)transmissions required by the key exchange protocol can be reduced when compared to that of a standard Diffie-Hellman key agreement under an end-to-end erasure model. The main advantages of the protocol here proposed are: i) reduction of the need to invoke public-key security mechanisms, ii) reduction of the amount of messages exchanged during the secret sharing procedure and iii) reduced complexity of security infrastructure. The scheme is robust to topology changes and link failures. Furthermore, the present solution preserves long-term privacy since there exists no link between the keys assigned by trusted nodes that serve different geographic regions. It also prevents man-in-the-middle attacks as the keys used to share a secret are already known by the nodes and issued by authorized entities. The present disclosure is applicable to similar schemes in the presence of trusted mobile nodes.

The proposed method provides an alternative solution to the problem of key management in vehicular networks using the concept of randomized key pre-distribution (RKPD) [8]. Since in RKPD keys are computed from the common information possessed by vehicles, interaction between users for key agreement is minimized. The proposed protocol does not intend to replace PKI-based schemes, since it is not aimed at guaranteeing authentication. Rather, it is envisioned to be a lightweight key distribution service that transparently enables network nodes to form a shared secret, allowing them to establish secure connections via symmetric encryption with implicit key agreement.

Main contributions are as follows:
Key distribution protocol: A probabilistic key distribution protocol that enables vehicles to establish secure pairwise connections with arbitrarily high probability of success and low communication complexity is proposed. The protocol exploits spatially bounded communication patterns that are present in VANETs by advertising the common keys between vehicles that are near each other.
Security and performance analysis: The effectiveness of establishing a secure connection is analyzed, as well as its robustness with respect to eavesdropping attacks. Simulations highlight the efficiency of the protocol, as well as the trade-offs between the density of trusted nodes and the speed of information dissemination.

This document is organized as follows. It will be provided a discussion on the existing solutions to the problem of secret key sharing in vehicular networks. It will also be presented the method of probabilistic key-distribution. The system setup and proposed protocol are described. The security of the scheme is analyzed. The model and environments under which the performance of the scheme is analyzed are described. It is also discussed several operational aspects of the proposed scheme.

The following pertains to the Key Distribution Scheme for VANETs and its network Model.

A VANET is composed of nodes, which can be mobile (vehicles) or static (road-side units or RSUs). A VPKI is assumed to be in place, so that nodes possess at least one pair of public-private keys and the corresponding certificates, issued by CAs. Each CA is responsible for a specific geographic region (e.g. one or more highways, an urban area, etc.) and acts as the root of trust for a VANET. The RSUs are infrastructure-based devices located next to the road, and therefore provide coverage within a given radio range. Ideally, the deployment coverage should be such that any vehicle can contact an RSU when entering a specific region controlled by a CA. However, it is important to note that the protocol can function even in environments with sparsely deployed RSUs. RSUs are considered to have a permanent connection to some CA. Vehicles are equipped with on-board units (OBUs) and IEEE 802.11p radios. No assumptions are made with respect to the penetration rate of equipped vehicles. Key dissemination is enabled by RSUs, albeit a more general case can be considered where key dissemination is enabled by any trusted node (static or mobile).

The following pertains to the Key Distribution Protocol.

The goal of the proposed scheme is to enable any two vehicles to establish a secure connection via a shared key. Each vehicle entering a certain geographic region requests a set of keys from an RSU that is within that region. Users can contact RSUs in one of two ways: a) through direct communication (i.e. when an RSU is within communication range) or b) through multi-hop communication (in which case vehicles flood a key request message to the network). The former approach limits the number of messages flooded in the network. On the other hand, it requires higher RSU density for a timely bootstrap, i.e., to satisfy the key requests immediately. The latter is more robust to sparse RSU densities, while being more prone to active attacks by intermediate nodes.

More precisely, let vehicle V send a key request message to an RSU with its public key $K_V$. The RSU draws a ring of k keys out of a pool of N keys, and sends the vehicle node the set of keys $\mathcal{K}_V$ (encrypted with the vehicle node's public key), along with the respective identifiers. Additionally, the RSU sends to vehicle node V a list of identifiers of the common keys shared by V and the set $\mathcal{N}(t)$ of vehicles that have contacted the RSU at most t seconds ago. By exploiting this information about nearby vehicles, vehicle V will be able to immediately establish a secure connection with the vehicles in $\mathcal{N}(t)$ without further interaction, as long as they share some keys. The RSU also informs its x-hop neighborhood, $\mathcal{N}_x$, about the presence of vehicle V, broadcasting the identifiers of keys attributed to vehicle V. This allows the vehicles in $\mathcal{N}_x$ to have fresh information about incoming vehicles that are geographically close. Suppose that two vehicle nodes share s keys, $k_1, \ldots, k_s$, with s>0. They secure the communication link by deriving a new shared secret $K=f(k_1, \ldots, k_s)$, where f(.) is a cryptographic hash function.

Figure 1:
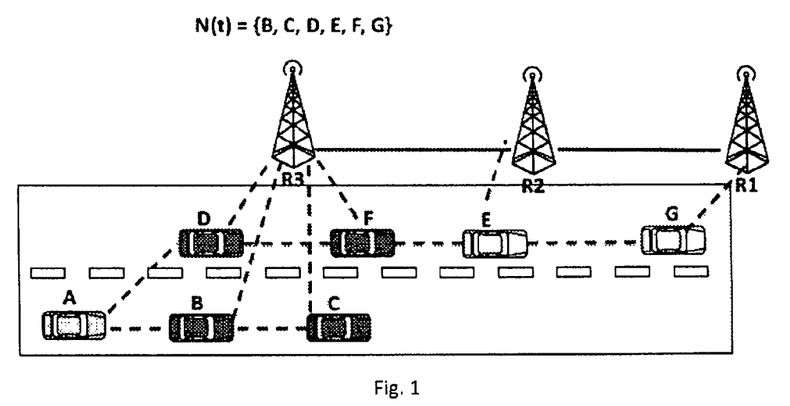

FIG. 1 illustrates the key dissemination procedure. Here, vehicle node A requests a set of keys to RSU $R_3$. Suppose this RSU has been contacted by all the nodes in the figure in the last t seconds, i.e. $N(t)=\{B,C,D,E,F,G\}$. RSU $R_3$ will send vehicle node A a list of all the key identifiers that vehicle nodes B, C, D, E, F and G have in common with vehicle node A. Now consider that RSU $R_3$ will inform its 1-hop neighborhood, $N_1=\{B,C,D,F\}$, about the keys assigned to vehicle node A, i.e., RSU R3 will send a message to vehicle nodes B, C, D and F with the key identifiers from vehicle node A. Assuming that vehicle node A shares keys with these nodes, it can immediately communicate securely with the set of vehicle nodes {B,C,D,E,F,G} without further interaction, while at the same time the set of vehicle nodes {B,C,D,F} can also immediately communicate securely with vehicle node A without further interaction.

The information flowing in the network is asymmetric and nodes might not be aware of other nodes' keys. With respect to the asymmetry, there are two cases that need to be taken into account. If the sender is not aware of the receiver's keys (that information has not reached him yet), both nodes need to broadcast key identifiers to find the common keys and proceed as before to compute the shared secret. The other case is when they do not have shared keys. In this case, they can fallback to one of the standard key agreement approaches.

It should be stressed that exposing identifiers of the keys does not directly compromise secure communication, since an attacker has to possess all the keys used to secure the link [8]. If an attacker compromises other vehicles, the keys he obtains are still random keys, thus knowing a priori the shared keys does not increase its probability of compromising a link.

The following pertains to security analysis and its threat model.

The concern in this work is to ensure means for confidential data transmission, and therefore it is assumed solutions are in place to solve other possible security issues. Confidentiality implies keeping the contents of messages secret to all users, except the authorized ones. In this context, the attacker is a passive entity which trie to eavesdrop on transmitted messages. Although passive attacks impose fewer risks to the safety of the vehicular network users, in general, they are also more difficult to detect than active attacks.

The messages exchanged over the wireless links are assumed to be encrypted—in particular, after bootstrapping the protocol, using the newly derived key. Under the assumption that the eavesdropper is unable to break the underlying cipher, his goal is to gain access to the key that is used to secure the link—in particular, after bootstrapping the protocol, the new derived key. Note that the presence of an eavesdropper is generally oblivious to both legitimate users. Moreover, users that comply with the communication protocol and are part of the network may also eavesdrop on other users.

The following pertains to the probability of secure connection.

The key used to encrypt the communication link (after bootstrap) is a function of intersection of the key sets assigned to each user. This means that adversaries can successfully attack a link if they possess all the keys used to compute the shared secret. In this context, a group of colluding eavesdroppers can be seen as a single eavesdropper with access to a larger set of keys.

Let $\mathcal{K}_A$ and $\mathcal{K}_B$ denote the ring of keys possessed by nodes A and B, respectively. Additionally, let $|\mathcal{K}_A|=|\mathcal{K}_A|=k$, and let the pool size be N. Let an eavesdropper contain a set of keys $\mathcal{E}$, with $0\leq|\mathcal{E}|=k'\leq N$. As the presence of this eavesdropper is not known, one does not know which keys are compromised. Nevertheless, the amount of keys required to compromise the security of pairwise connections can be estimated. Let $P(|\mathcal{K}_A \cap \mathcal{K}_B|=s)$ denote the probability that two legitimate nodes share exactly s keys, $0\leq s\leq k$. Then $$P(|\kappa_A \cap \kappa_B|=s) = \frac{\binom{N}{s}\binom{N-s}{k-s}\binom{N-k}{k-s}}{\binom{N}{k}\binom{N}{k}}$$

Let the number of neighboring nodes at a given time be d. A link is secure with respect to its neighboring nodes if nodes share at least s keys, with s>0, and these s keys are not compromised by d neighbors. The probability that a link is secure is given by $$P_S = 1 - \sum_{s=0}^{k} P(|\kappa_A \cap \kappa_B|=s)\left(1-\left(1-\frac{k}{N}\right)^d\right)^s$$

Define outage as the event that an eavesdropper with access to a set of keys $\mathcal{E}$ is able to compromise the security of a link. The outage probability can then be defined as $$P_{outage} = P(\kappa_A \cap K_B \subseteq \varepsilon)$$

$$= \sum_{s=0}^{k} \frac{\binom{N}{s}\binom{N-s}{k-s}\binom{N-k}{k-s}\binom{N-s}{k'-s}}{\binom{N}{k}^2\binom{N}{k'}}.$$

Figure 2A:
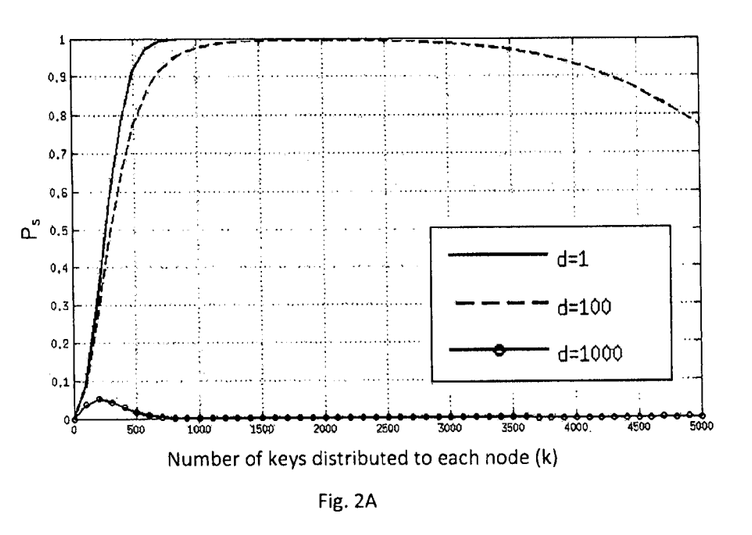
FIGS. 2A-B: Schematic representation for an embodiment of the probability of two nodes sharing a secret key not possessed by any of their d neighbors. Key pool size P=100000. d=1, 100, and 100 in FIG. 2A, and d=25, 250, 500, and 2500 in FIG. 2B.
Figure 2B:
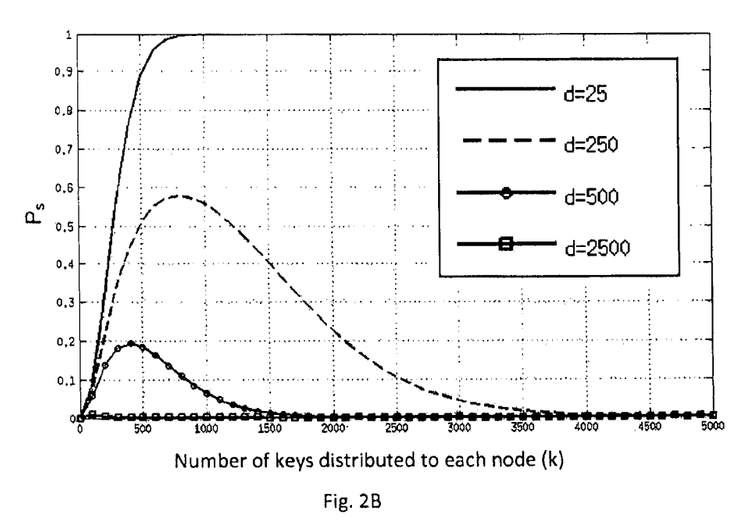
Figure 3:
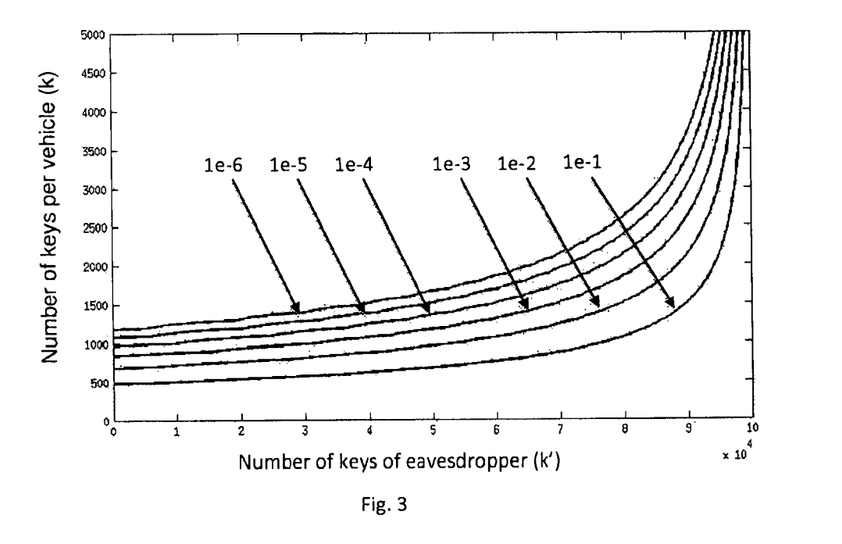
FIG. 3: Schematic representation for an embodiment of the Outage probability for P=100000. Lines are for a probability of outage of respectively $P_{outage}$=[1e-1, 1e-2, . . . , 1e-6].

There exists a trade-off between $P_S$ and $P_{outage}$. On one hand, it is required that the probability of establishing a secure connection be arbitrarily high, i.e., users are able to derive secret keys even in the presence of a possibly large amount of neighbors. On the other hand, the outage probability should be kept vanishingly small for the chosen parameters, such that colluding eavesdroppers are not able to compromise the system. FIGS. 2A-B show the probability that a secure connection can be established in presence of d neighbors, each one having k keys. As the number of neighbors increases, the probability of having a secure connection diminishes. However, the scheme shows some robustness for a reasonable numbers of neighbors: for a pool of P=100000 keys, distributing k=1500 keys is sufficient to have an almost certain secure connection up the presence of 100 neighbors. On the other hand, FIG. 3 shows the outage probability as a function of the number of keys k' obtained by colluding eavesdroppers and the number of keys k given to each user. In particular, for a pool of P=100000 keys, if k=1500 keys are distributed to each vehicle, an eavesdropper who collects approximately k'=40000 keys only has a probability $P_{outage}=10^{-6}$ of compromising a link, thus showing the system is fairly robust.

The following pertains to the reliability.

Analyzing the reliability of a key distribution scheme in a dynamic scenario such as a vehicular network is a complex task. Consider a basic version of the Diffie-Hellman (DH) key agreement [7] assuming an end-to-end erasure model, where packets are lost with probability $\epsilon$.

Assume that node A wishes to share a secret with node B. In the DH protocol, each node transmits a message prior to computing a shared secret. Additionally, the two nodes must acknowledge the reception of both packets, which gives four transmissions in total. In the proposed protocol, if A and B share keys assigned by the RSU and are aware of the common keys, they already possess a shared secret. If they are unaware of the common keys, they will broadcast their key identifiers and acknowledge the reception of this information, i.e., they will use the same number of transmissions as a DH scheme. Lastly, if they do not share keys, they will fallback to the DH scheme.

The reduction on the number of transmitted messages can be analyzed through the probability $\gamma$ that two nodes are able to exchange keys without having to retransmit any packets. A similar analysis can be done for more elaborate retransmission schemes. For the basic DH scheme the aforementioned probability is given by $\gamma_{dh}=(1-\epsilon)^4$. Let the probability of two nodes sharing keys be denoted by $P_S$, the probability that a successful key exchange occurred by $P_X$ and let $P_B=P(B\in N(t))$. Also let the complement of the first two events be denoted by $P_{\underline{S}}$ and $P_{\underline{B}}$. Let $P_S=1-\alpha$, $P_B=1-\beta$ and $P_X=(1-\beta)^4$. In the proposed method, the probability that A is able to share a secret with B without the need for retransmissions is given by $$\gamma = P_S[P_B + P_{\underline{B}}P_X] + P_{\underline{S}}P_X$$
$$= (1-\alpha)[(1-\beta) + \beta(1-\epsilon)^4] + \alpha(1-\epsilon)^4$$
$$= (1-\epsilon)^4(\alpha + (1-\alpha)\beta) + (1-\alpha)(1-\beta).$$

Figure 4:
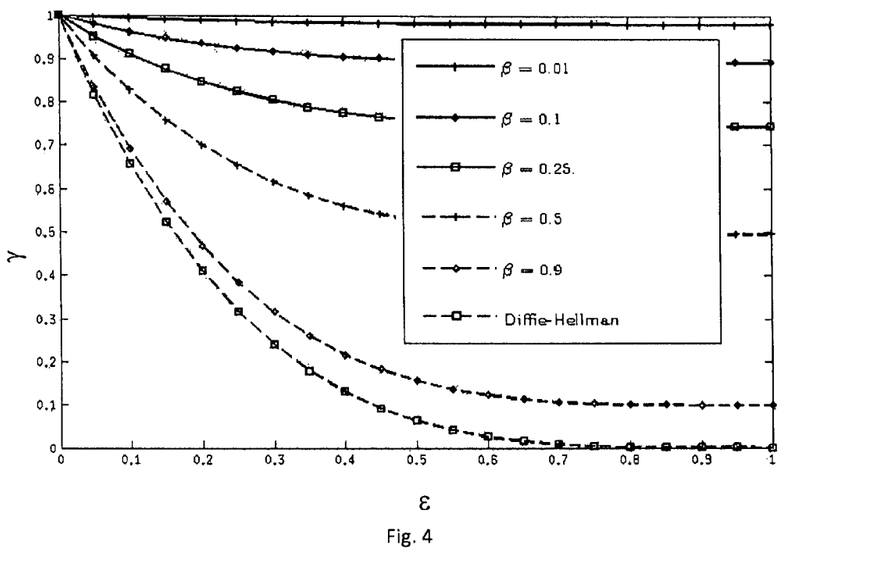
FIG. 4: Schematic representation for an embodiment of the probability that two nodes are able to share a secret without retransmission for $\alpha=10^{-2}$.

As expected, when nodes do not share keys ($\alpha \to 1$) or are not aware of any shared keys ($\alpha \to 0$, $\beta \to 1$), $\gamma$ reduces to the DH case. On the other hand, when $\alpha \to 0$ and $\beta \to 0$, $\gamma \to 1$. FIG. 4 shows the values of $\gamma$ for $\alpha=10^{-2}$ and varying values of $\beta$. $\gamma$ decays much slowly for small values of $\beta$, collapsing with the DH case when $\beta=1$. The plot shows that the scheme is fairly robust to $\epsilon$ for small values of $\beta$, meaning that if the RSU is able to inform a large enough number of vehicles, one can compensate for the consequences of channel errors. This is particularly useful in an unpredictable environment such as a VANET, where many packet losses occur sporadically due to obstacles in signal propagation.

In the following, several aspects related to specific security issues in vehicular ad-hoc networks, that can influence the correct operations of the proposed protocol, are discussed.

The following pertains to node compromise.

As in any other ad-hoc network, the nodes of a vehicular network can be compromised (e.g., a vehicle can be stolen). Thus, efficient key revocation mechanisms must ensure that compromised nodes do not impair network security. In particular, with respect to random key distribution schemes, several techniques can be used. A centralized approach can be used, where a base station (e.g. an RSU) broadcasts revocation messages to all nodes that need to remove copies of the revoked keys. The drawback of such approach is a single point of failure of the revocation scheme. Additionally, this approach involves the broadcast of messages over long distances, which might result in an undesirable communication overhead. On the other hand, key revocation can be performed in a distributed fashion. Such an approach is taken in [15] in the context of sensor networks and could be extended to vehicular networks. Note that, since public keys from the revoked nodes are known, the information regarding revoked nodes can be propagated to other regions controlled by different CAs.

In case an RSU is compromised, the CA should provide a new pool of keys to all RSUs that are not compromised from which vehicles will be able to obtain new keys. Prior keys obtained from the compromised RSU should also be revoked and vehicle informed of the compromise (e.g., by broadcast of a revocation message to all vehicles).

The following pertains to operating across boundaries.

Since the key space is independently partitioned over a geographical space, a mechanism that ensures vehicles can communicate with vehicles controlled by other CAs is required. This can be achieved by considering parallel key spaces that address these geographical boundaries. The key pools can be coordinated among the different CAs, and vehicles that require communication between independent CAs should request a set of keys from this pool. This mechanism would operate much as a roaming service to provide keys to every possible geographic region.

This roaming service can also be used to assign keys to vehicles that are entering a certain CA geographic region without the need to communicate with an RSU that is within that CA region for requesting keys specific to that CA geographic region.

Consider (see FIG. 6) that a vehicle in a geographic region controlled by CA 2 wishes to communicate with another vehicle that is located within the geographic region covered by CA 3. Then, the vehicle must send a request message to an RSU requiring a set of keys for a new key space, which holds the keys to be used for vehicles communicating between the regions defined by CA 2 and CA 3. These keys are independent from the keys used within each region. The key establishment procedure can now take place as described in the text pertaining to the key distribution protocol.

Figure 6:
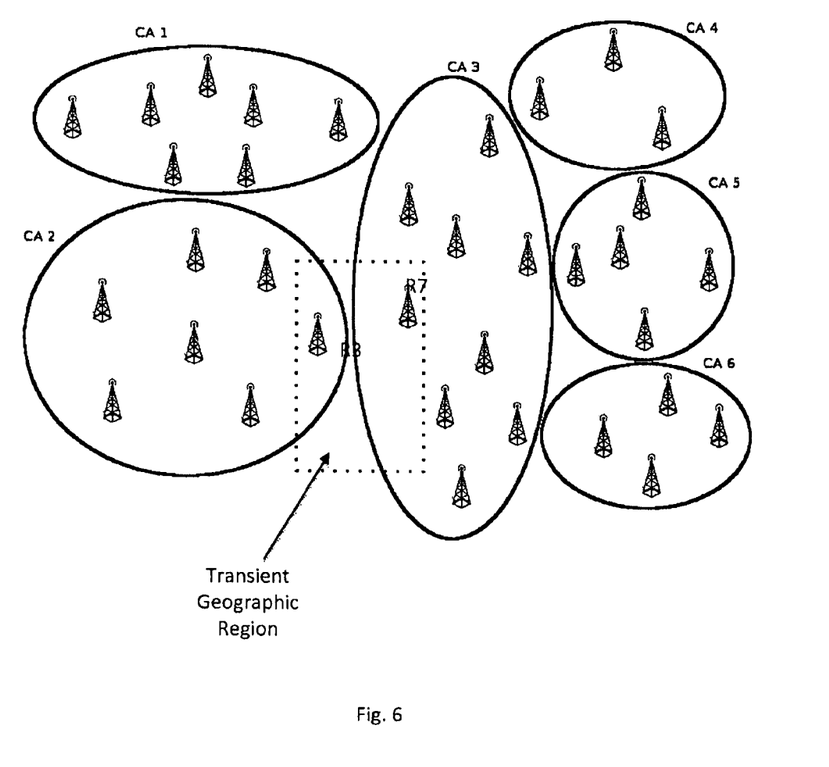
FIG. 6: Schematic representation for an embodiment of roaming between VANETs.

On the other hand, consider a vehicle that is moving from a region covered by CA 2 onto the region covered by CA 3. Then, this vehicle can proactively request an RSU within this CA2 region for keys for the new region CA3 to which he is moving towards. This request should be preferably done to RSUs that are near the border of the region. The RSU then requests CA 2 for a set of keys that can be used within the region controlled by CA 3. CA 2 forwards this request to CA 3, which answers with a set of keys and a list of identifiers encrypted with the vehicles public key. The vehicle can now use these keys immediately once he reaches the region controlled by CA 3.

VANET is commonly defined as a Vehicular Ad-Hoc Network which is a class of wireless networks composed of mobile and static nodes. Mobile nodes are nodes whose geographic position changes according to time at different velocities. The most common form of mobile nodes are vehicles equipped with wireless interfaces of homogeneous or heterogeneous technologies. Vehicles can either be private or belong to a public transportation system. Other mobile nodes can also be a part of the network such as mobile end-user devices (these are generally characterized by slow mobility). Static nodes do not change their geographic position in time. They can be a part of a specialized network infrastructure such as road-side units (or road-side equipment) that supports vehicular communication. These units can be part of private networks, controlled by network operators/service providers or part of a network controlled by a public entity, such as the government or a municipality. For example, see the reference: Vehicular Network: Techniques, Standards, and Applications. Published: Apr. 9, 2009. Editors: Hassnaa Moustafa; Yan Zhang (Chapter 1).

Certificate Authorities (CAs) are commonly defined as entities assumed to be responsible for the certification/attribution of public/private keys that are permanently assigned to vehicles. There are two types of envisioned CAs: public authorities (such as vehicle registration authorities) or private authorities (such as car manufacturers). In the case of public authorities several types of CAs can be considered according to some geographic refinement (e.g. a CA covers vehicles within a country, state, metropolitan area, etc. . . . ). Different CAs are assumed to be cross-certified so that vehicles with keys issued by different CAs can authenticate/communicate with each other. For example, see the reference: Securing Vehicular Communications, Maxim Raya, Panos Papadimitratos, Jean-Pierre Hubaux. In IEEE Wireless Communications Magazine, Special Issue on Inter-Vehicular Communications, October 2006.

VPKI, vehicular public key infrastructure, is commonly defined as an infrastructure responsible for providing a set of security services, bled on public key cryptography, that support vehicular communications. Examples of services include positioning, authentication, privacy and confidentiality. They are supported by CAs which issue/certificate the cryptographic material. The VKPI is ultimately responsible for providing a robust and scalable key management scheme. For example, see the reference: Securing Vehicular Communications, Maxim Raya, Panos Papadimitratos, Jean-Pierre Hubaux. In IEEE Wireless Communications Magazine, Special Issue on Inter-Vehicular Communications, October 2006.

The embodiments described may be combined. The following claims set out particular embodiments of the invention.

BRIEF DESCRIPTION OF DRAWINGS

The following figures provide preferred embodiments for illustrating the description and should not be seen as limiting the scope of invention.

FIG. 1: Schematic representation of a first preferred embodiment of an example of the key request procedure where:

(A) represents the vehicle requesting keys,
(B) represents a vehicle in the network that may want to have a secure connection with A,
(C) represents a vehicle in the network that may want to have a secure connection with A,
(D) represents a vehicle in the network that may want to have a secure connection with A,
(E) represents a vehicle in the network that may want to have a secure connection with A,
(F) represents a vehicle in the network that may want to have a secure connection with A,
(G) represents a vehicle in the network that may want to have a secure connection with A,
(R1) represents a Road Side Unit,
(R2) represents a Road Side Unit, and
(R3) represents a Road Side Unit to which A requests a set of keys.

DETAILED DESCRIPTION

Results from the previous section depend on a timely bootstrap of the system, which can be assessed through computer simulations. Focusing on urban environments, the STRAW mobility model [11] is used to simulate vehicular mobility on a 27 km$^2$ area of downtown Pittsburgh, Pa., USA, characterized by a combination of Manhattan-like orthogonal and irregularly shaped intersections. The results presented comprise a vehicle density of $\rho=10$ vehicles/km$^2$, which can be thought of as a sparse vehicular network. RSUs are randomly deployed with densities of 0.37, 0.92, and 1.82 RSUs/km$^2$. For each RSU deployment density, 50 simulations were performed. Each simulation run was 270 seconds, with a 100 second warm-up period for the mobility model. The considered communication model is a unit-disk wireless model of 150 meters radius for vehicle-to-vehicle (V2V) communications and 300 meters radius for vehicle-to-infrastructure (V2I) communications. It has been shown that, for appropriate radius, disk models mimic the shadow fading models well on a system-level [12]. Different transmission ranges were selected for V2V and V2I links based on recent experimental studies reported in [13] and [14], which showed that the RSUs placed on elevated positions above the intersections are less prone to shadowing loss, particularly from other obstructing vehicles. The parameters of the protocol are set to t=10 seconds and x=5.

Figure 5A:
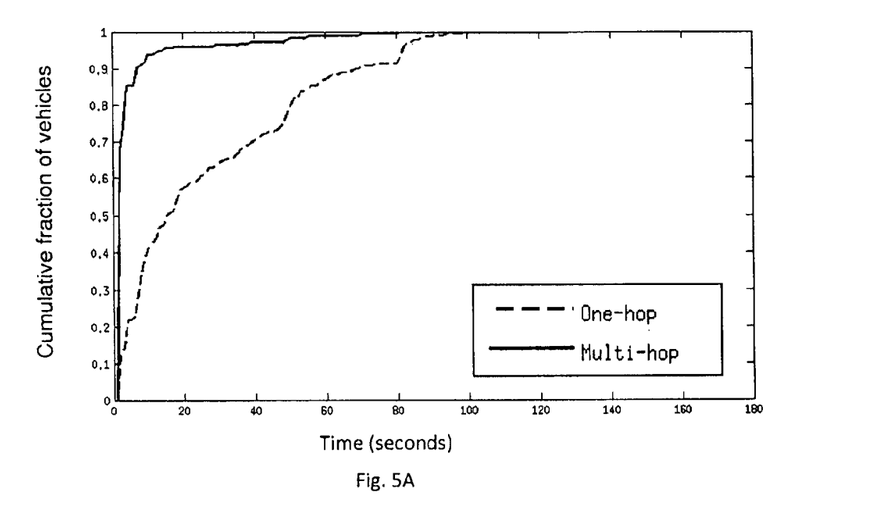
FIGS. 5A-C: Schematic representations for an embodiment of the key dissemination time for three RSU densities. Nodes are allowed to request keys in one hop (dashed lines) and multi-hop (solid lines). The vehicle density is $\rho=10$ vehicles/km$^2$.
Figure 5B:
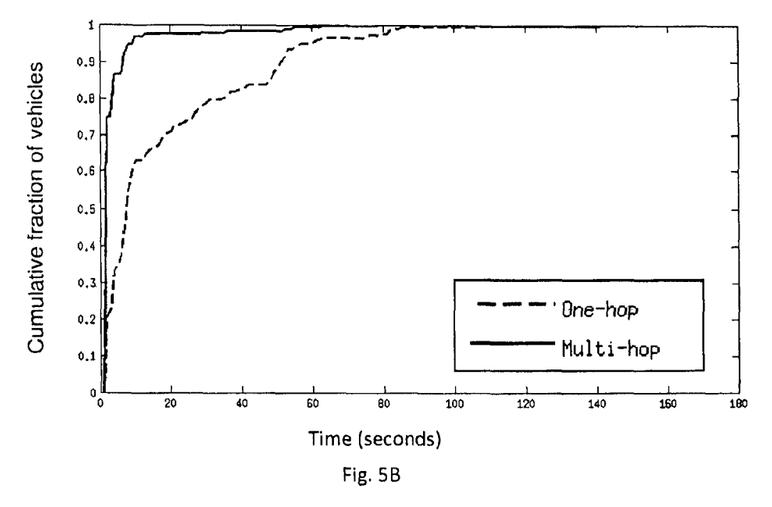
Figure 5C:
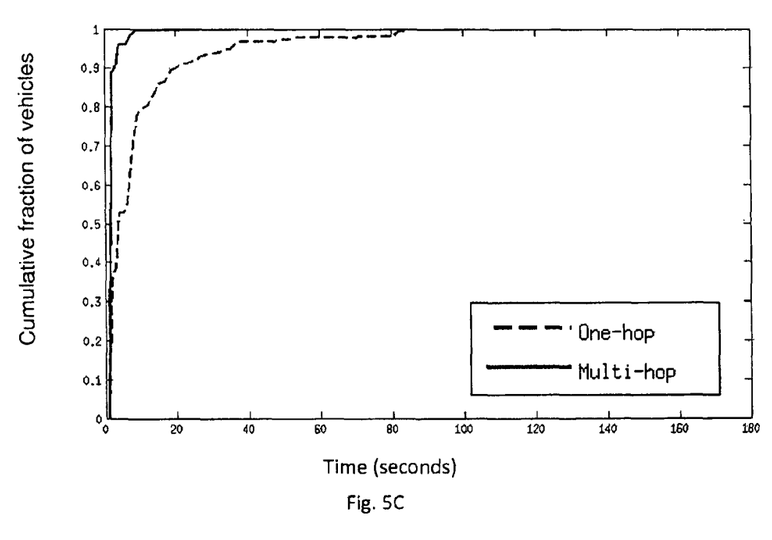

The proposed scheme allows nodes to request keys through one-hop (direct communication with RSU) or multi-hop communications (broadcast). In FIGS. 5A-C, for three RSU densities, it is shown the cumulative fraction of vehicles that receive their keys within a given time. The dashed lines represent the case of one-hop and solid lines the case of multi-hop. The figure shows that key dissemination time in the multi-hop case is almost immediate. On the other hand, the one-hop case requires a high RSU density to achieve a timely bootstrap. Multi-hop communication at 0.92 RSUs/km$^2$ achieves a similar performance as single-hop at 1.82 RSUs/km$^2$. Simulations also confirm that increasing the vehicular density speeds up key dissemination considerably in the multi-hop case, while having almost no impact in one-hop case.

In addition, the percentage of secure paths that are immediately available for communications, i.e., when two nodes meet for the first time, is analyzed. A path between two nodes is considered secure if and only if each link of the path is secure. Note that this definition is directed, i.e., a secure path from A to B does not necessarily imply a secure path from B to A.

Table 1 shows the percentage of secure paths of minimum distance as a function of the path length. When vehicles request keys directly from the RSU, the percentage of secure connections is low whereas in the multi-hop case these values are higher. This is due to the fact that vehicles take more time to obtain their keys, and therefore when vehicles meet for the first time, they do not possess a ring of keys. When increasing the RSU density the percentage of secure connections for both cases increases. These percentages can be considered estimates for the β parameter of the reliability analysis.

TABLE 1

Percentage of secure paths of length L for $\rho = 10$ vehicles/km².

| | One-hop to RSU | | | Multi-Hop to RSU | | |
|---|---|---|---|---|---|---|
| L | $\delta_1 = 0.37$ | $\delta_1 = 0.92$ | $\delta_1 = 1.82$ | $\delta_2 = 0.37$ | $\delta_2 = 0.92$ | $\delta_2 = 1.82$ |
| 1 | 46.20% | 67.41% | 85.33% | 60.30% | 82.18% | 94.18% |
| 2 | 41.29% | 63.60% | 83.25% | 58.50% | 81.65% | 94.45% |
| 3 | 38.82% | 62.04% | 82.17% | 58.14% | 82.07% | 94.71% |
| 4 | 40.52% | 63.91% | 82.55% | 61.29% | 84.18% | 95.27% |
| >=5 | 36.73% | 65.34% | 84.20% | 65.21% | 88.78% | 96.80% |

The invention is of course not in any way restricted to the embodiments described and a person with ordinary skill in the art will foresee many possibilities to modifications thereof without departing from the invention as defined in the appended claims.

The invention claimed is:

1. A road-side unit node (RSU node) configured for operation in a vehicular ad hoc network (VANET) comprising VANET nodes, each VANET node being either a mobile vehicle node equipped with an on-board unit or a static road-side unit node, herewith referred respectively as vehicle nodes and RSU nodes, the RSU node comprising an interface to the VANET, and a computer processor and non-transitory computer readable data carrier comprising computer program instructions, where the computer program instructions, when executed on the computer processor causes the RSU node to:
maintain a permanent connection to a certificate authority (CA), said CA being responsible for a specific geographic region in which the VANET is comprised and said CA acting as a root of trust for the VANET;
accept requests from vehicle nodes of the VANET via the interface, each request being sent by a vehicle node on entering said specific geographic region and including a request for a set of keys from the RSU node and a public key of said vehicle node, said request being sent from the vehicle node to the RSU node by direct communication or through multi-hop communication; and
for each accepted request from a vehicle node,
send said vehicle node a set of private keys, selected from a pool of private keys available to the RSU node, said set of private keys being encrypted with the vehicle node public key, wherein said set of private keys also includes a key identifier for each private key in said set of private keys,
send said vehicle node a list with the key identifiers of the private keys shared by said vehicle node and other vehicle nodes that have most recently contacted the RSU node for a predetermined period of time, and
inform VANET nodes, within a neighborhood of a predetermined number of hops from said RSU, of presence of said vehicle node and of the identifiers of the private keys obtained by said vehicle node, including enabling two vehicle nodes to immediately establish a secure connection if there are shared private keys between those two vehicles, without further interaction, by deriving a new shared secret which is a cryptographic hash function of the private keys shared by said two vehicle nodes.

2. The RSU node of claim 1, wherein said instructions further cause the RSU node to, when another RSU node or vehicle node is compromised,
receive from the CA a new pool of private keys that are not compromised, from which said pool of private keys the RSU node is able to provide new private keys to vehicle nodes, and
inform vehicle nodes of the existence of the compromised RSU node or vehicle node.

3. The RSU node of claim 1, wherein the private key identifiers are sequential IDs attributed as the private keys are generated.

4. The RSU node of claim 1, wherein said instructions further cause the RSU node to, on a vehicle node moving from a first CA geographic region to a second CA geographic region:
accept from said vehicle node, before said vehicle node leaves said first CA geographic region, a request of a set of private keys, the RSU node being within range of the vehicle node and within that first CA region, the request indicating that those requested private keys are for said second CA geographic region; and
send the vehicle node request to the first CA for a set of private keys that can be used within the region controlled by the second CA; causing the first CA to forward the vehicle node request to the second CA; and thereby causing the second CA to respond with a set of private keys that can be used within the region controlled by the second CA with the respective list of identifiers which are sent to the vehicle node encrypted with the vehicle node public key;
thereby enabling the vehicle node to be able to immediately establish a secure connection with any node in said second CA geographic region by deriving a new shared secret which is a cryptographic hash function of the private keys shared by the two nodes.

5. RSU node device according to claim 4, wherein the RSU node is a RSU border node of first CA geographic region.

6. The RSU node of claim 1, wherein, for key distribution spanning multiple independent CAs, each CA being associated with a predetermined geographical area, the pool of private keys is unique to a partitioned key space corresponding to the geographical area of each independent CA.

7. The RSU node of claim 6, wherein the pool of private keys comprises an additional key space that is parallel to said CAs and is thus shared by all CAs.

8. The RSU node of claim 7, wherein said additional key space is made available by the RSU nodes only to vehicles that require communication between independent CAs.

9. A system comprising a plurality of nodes of a vehicular ad hoc network (VANET), the plurality of VANET nodes including at least a first static road-side unit node (RSU node) and first a mobile vehicle node, wherein the system includes non-transitory computer readable media comprising computer program instructions for execution on processors at the VANET nodes, said instructions configuring the VANET nodes, wherein the first RSU node is configured for key distribution by trusted nodes of the VANET, wherein said first RSU node is configured to maintain a permanent connection to a certificate authority, CA, said CA being responsible for a specific geographic region in which the VANET is comprised and said CA acting as a root of trust for the VANET, and wherein the VANET nodes have at least one pair of public-private keys and corresponding certificates, issued by said CA; and the first mobile vehicle node is configured to, on entering said specific geographic region, request a set of keys from said RSU node that is within range and within that region, either by direct communication, or by through multi-hop communication, the first RSU node is further configured to receive from said vehicle node the request for the set of keys, said request including a public key of said vehicle node, and to send to said vehicle node a set of private keys, selected from a pool of private keys available to said RSU node, said set of private keys being encrypted with the vehicle node public key, wherein said set of private keys also includes a key identifier for each private key in said set of private keys;

the first RSU node is further configured to send said vehicle node a list with the key identifiers of the private keys shared by said vehicle node and other vehicle nodes that have most recently contacted said RSU node for a predetermined period of time;

the first RSU node is further configured to inform VANET nodes, including a second mobile vehicle node, within a neighborhood of a predetermined number of hops from said RSU node, of presence of said vehicle node and of the identifiers of the private keys obtained by said vehicle node; and wherein the first mobile vehicle node is further configured to establish a secure connection with the second mobile vehicle node, without further interaction with the RSU node, by deriving a new shared secret using a cryptographic hash function of private keys shared by the first and the second mobile vehicle nodes.

10. The system of claim 9, wherein said first RSU node is further configured to perform a method in which a sender node being interested in communicating with a receiver node, if said sender node does not know private keys held by the receiver node, said method comprises the step of both nodes broadcasting key identifiers of the private keys held by each node, such that if there are shared private keys then two nodes are then able to establish a secure connection, without further interaction, by deriving a new shared secret which is a cryptographic hash function of the private keys shared by said sender node and said receiver node.

11. The system of claim 10, wherein the first RSU node is further configured such that if there are no shared keys between the two nodes, then the two nodes will establish a shared secret via standard public key cryptography (PKC) methods.

12. The system of claim 9, wherein said first RSU node is further configured to perform a method in which if another RSU node or vehicle node is compromised, said method comprises the steps of:

receiving from the CA a new pool of private keys that are not compromised, from which said pool of private keys the vehicle nodes will then be able to obtain new private keys; and informing vehicle nodes of the existence of the compromised RSU node or vehicle nodes.

13. The system of claim 9, wherein said RSU node is further adapted such that the private key identifiers are sequential IDs attributed as the private keys are generated.

14. The system of claim 9, wherein said RSU node is further adapted such that, for key distribution spanning multiple independent CA's, each CA with a predetermined geographical area, the pool of private keys available to said RSU node is unique to a partitioned key space corresponding to the geographical area of each independent CA.

15. The system of claim 14, wherein the pool of private keys available to said RSU node comprises an additional key space that is parallel to said CAs and is thus shared by all CAs.

16. The system of claim 15, wherein said first RSU node is further configured such that said additional key space is made available by said RSU node only to vehicles that require communication between independent CAs.

17. The system of claim 16, wherein said first RSU node is further configured to perform a method in which, on a vehicle node moving from a first CA geographic region to a second CA geographic region, comprises the following steps:

receiving from said vehicle node, before said vehicle node leaves said first CA geographic region, a request of a set of private keys, the RSU node being within range of the vehicle node and within that first CA region, the request indicating that those requested private keys are for said second CA geographic region;

sending the vehicle node request to the first CA for a set of private keys that can be used within the region controlled by the second CA; such that the first CA forwards the vehicle node request to the second CA; and the second CA responds with a set of private keys that can be used within the region controlled by the second CA with the respective list of identifiers which are sent to the vehicle node encrypted with the vehicle node public key;

wherein the vehicle node will be able to immediately establish a secure connection with any node in said second CA geographic region by deriving a new shared secret which is a cryptographic hash function of the private keys shared by the two nodes.

18. The system of claim 17, wherein the RSU node is a RSU border node of first CA geographic region.

19. Software stored on non-transitory computer readable media, comprising instructions for execution on processors of a plurality of nodes of a vehicular ad hoc network (VANET), the plurality of VANET nodes including at least a first static road-side unit node (RSU node) and first a mobile vehicle node, said instructions configuring the VANET nodes such that when the instructions are executed on the processors on the first RSU node and on the first mobile vehicle node, the first RSU node is configured for key distribution by trusted nodes of the VANET, wherein said first RSU node is configured to maintain a permanent connection to a certificate authority, CA, said CA being responsible for a specific geographic region in which the VANET is comprised and said CA acting as a root of trust for the VANET, and wherein the VANET nodes have at least one pair of public-private keys and corresponding certificates, issued by said CA; and the first mobile vehicle node is configured to, on entering said specific geographic region, request a set of keys from said RSU node that is within range and within that region, either by direct communication, or by through multi-hop communication, the first RSU node is further configured to receive from said vehicle node the request for the set of keys, said request including a public key of said vehicle node, and to send to said vehicle node a set of private keys, selected from a pool of private keys available to said RSU node, said set of private keys being encrypted with the vehicle node public key, wherein said set of private keys also includes a key identifier for each private key in said set of private keys;

the first RSU node is further configured to send said vehicle node a list with the key identifiers of the private keys shared by said vehicle node and other vehicle nodes that have most recently contacted said RSU node for a predetermined period of time;

the first RSU node is further configured to inform VANET nodes, including a second mobile vehicle node, within a neighborhood of a predetermined number of hops from said RSU node, of presence of said vehicle node and of the identifiers of the private keys obtained by said vehicle node; and wherein the first mobile vehicle node is further configured to establish a secure connection with the second mobile vehicle node, without further interaction with the RSU node, by deriving a new shared secret using a cryptographic hash function of private keys shared by the first and the second mobile vehicle nodes.

* * * * *